United States Patent [19]

Pfefferle

[11] 4,065,917

[45] Jan. 3, 1978

[54] METHOD OF STARTING A COMBUSTION SYSTEM UTILIZING A CATALYST

[75] Inventor: William C. Pfefferle, Middletown, N.J.

[73] Assignee: Engelhard Minerals & Chemicals Corporation, Iselin, N.J.

[21] Appl. No.: 752,272

[22] Filed: Dec. 20, 1976

Related U.S. Application Data

[60] Division of Ser. No. 644,873, Dec. 29, 1975, which is a continuation-in-part of Ser. No. 142,939, May 13, 1971, abandoned, Ser. No. 164,718, July 21, 1971, abandoned, and Ser. No. 358,411, May 8, 1973, Pat. No. 3,928,961.

[51] Int. Cl.[2] ........ F02C 3/04

[52] U.S. Cl. ........ 60/39.82 C; 60/39.02; 60/39.69 A; 60/39.71; 431/6

[58] Field of Search ........ 60/39.02, 39.69, 39.71, 60/39.82 C; 431/6, 2, 7

[56] References Cited

U.S. PATENT DOCUMENTS

| | | | |
|---|---|---|---|
| 2,624,172 | 1/1953 | Houdry | 60/39.52 X |
| 2,632,296 | 3/1953 | Houdry | 60/39.52 X |
| 3,577,731 | 5/1971 | Bruchez | 60/39.82 C |
| 3,751,906 | 8/1973 | Leas et al. | 60/39.02 |

FOREIGN PATENT DOCUMENTS

| | | | |
|---|---|---|---|
| 1,467,142 | 12/1966 | United Kingdom | 60/39.82 C |

*Primary Examiner*—Edward G. Favors

[57] ABSTRACT

A method and system are provided for starting a combustion system utilizing a catalyst, and at the same time provide low emissions of unburned hydrocarbons and carbon monoxide.The method is particularly applicable to starting such combustion systems which are subject to intermittent operation, such as for example, gas turbines used to power automotive vehicles in which carbonaceous fuels are combusted to provide the motive fluid, or furnaces which are used intermittently. In the method, heat, such as produced by electrical means or by thermal combustion of a carbonaceous fuel, is employed to bring the catalyst to an operating temperature which will permit rapid oxidation of the carbonaceous fuel. When the catalyst has been heated to reach such operating temperatures, the start-up heating may be terminated and the normal operation of the combustion zone including the catalyst may proceed.

2 Claims, 2 Drawing Figures

METHOD OF STARTING A COMBUSTION SYSTEM UTILIZING A CATALYST

Figure 1:
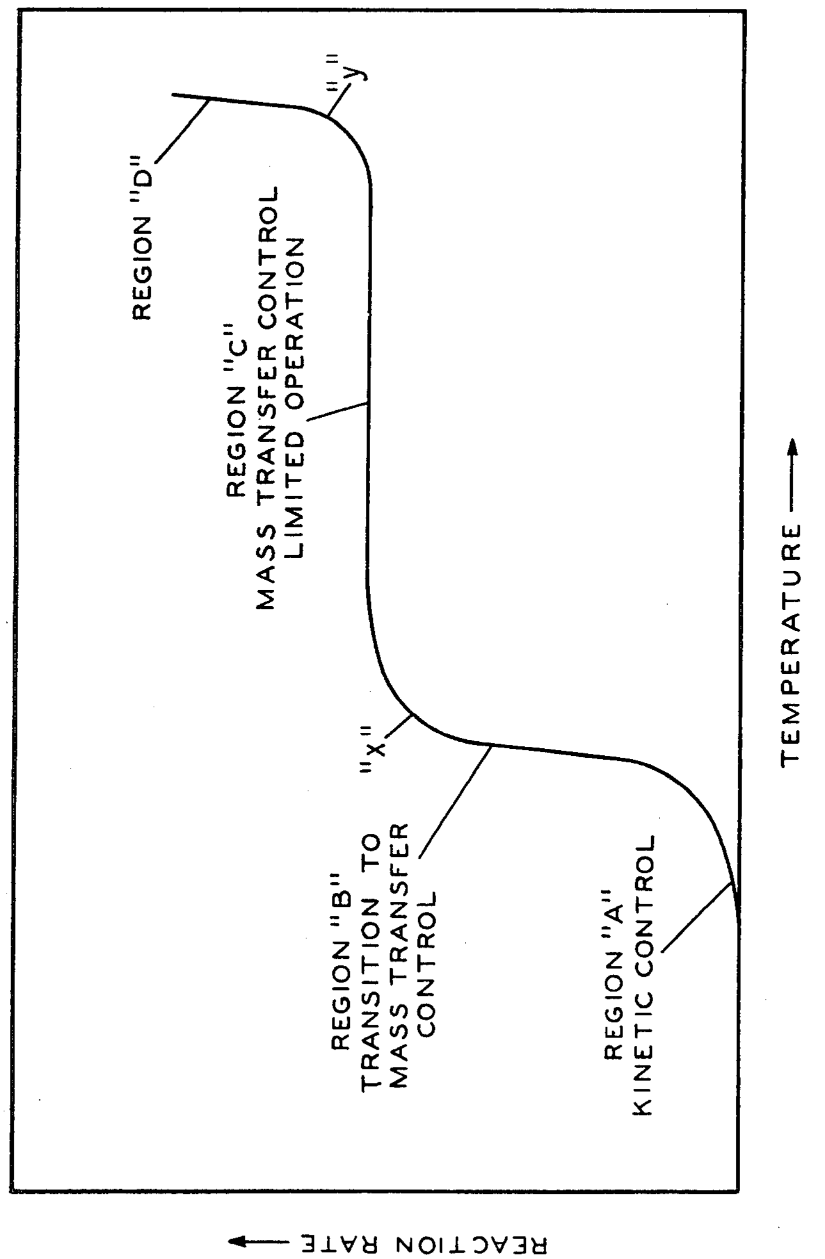

This is a division of application Ser. No. 644,873 filed Dec. 29, 1975, which is a continuation-in-part of my prior abandoned applications, Ser. No. 142,939, filed May 13, 1971, abandoned and Ser. No. 164,718, filed July 21, 1971, abandoned and my copending application, Ser. No. 358,411, filed May 8, 1973 now U.S. Pat. No. 3,928,961.

BACKGROUND OF THE INVENTION

In conventional thermal combustion systems, a fuel and air in flammable proportions are contacted with an ignition source, e.g., a spark to ignite the mixture which will then continue to burn. Flammable mixtures of most fuels are normally burned at relatively high temperatures, i.e., in the order of about 3,300° F and above, which inherently results in the formation of substantial emissions of $NO_x$. In the case of gas turbine combustors, the formation of $NO_x$ can be decreased by limiting the residence time of the combustion products in the combustion zone. However, even under these circumstances undesirable quantities of $NO_x$ are nevertheless produced.

In combustion systems utilizing a catalyst, there is little or no $NO_x$ formed in a system which burns the fuel at relatively low temperatures. Such combustion heretofore has been generally regarded as having limited practicality in providing a source of power as a consequence of the need to employ amounts of catalyst so large as to make a system unduly large and cumbersome. Consequently, combustion utilizing a catalyst has been limited generally to such operations as treating tail gas streams of nitric acid plants, where a catalytic reaction is employed to heat spent process air containing about 2% oxygen at temperatures in the range of about 1,400° F.

In my copending application Ser. No. 358,411, filed May 8, 1973, and incorporated herein by reference, there is disclosed the discovery of catalytically-supported, thermal combustion. According to this method, carbonaceous fuels can be combusted very efficiently at temperatures between about 1,700° and 3,200° F, for example, without the formation of substantial amounts of carbon monoxide or nitrogen oxides by a process designated catalytically-supported, thermal combustion. To summarize briefly what is discussed in greater detail in application Ser. No. 358,411, in conventional thermal combustion of carbonaceous fuels, a flammable mixture of fuel and air or fuel, air, and inert gases is contacted with an ignition source (g.e., a spark) to ignite the mixture. Once ignited, the mixture continues to burn without further support from the ignition souce. Flammable mixtures of carbonaceous fuels normally burn at relatively high temperatures (i.e., normally well above 3,300° F). At these temperatures substantial amounts of nitrogen oxides inevitably form if nitrogen is present, as is always the case when air is the source of oxygen for the combustion reaction. Mixtures of fuel and air or fuel, air, and inert gases which would theoretically burn at temperatures below about 3,300° F are too fuel-lean to support a stable flame and therefore cannot be satisfactorily burned in a conventional thermal combustion system.

In conventional catalytic combustion, on the other hand, the fuel is burned at relatively low temperatures (typically in the range of from a few hundred degrees Fahrenheit to approximately 1,400° F). Prior to the invention described in application Ser. No. 358,411, however, catalytic combustion was regarded as having limited value as a source of thermal energy. In the first place, conventional catalytic combustion proceeds relatively slowly so that impractically large amounts of catalyst would be required to produce enough combustion effluent gases to drive a turbine or to consume the large amounts of fuel required in most large furnace applications. In the second place, the reaction temperatures normally associated with conventional catalytic combustion are too low for efficient transfer of heat for many purposes, for example transfer of heat to water in a steam boiler. Typically, catalytic combustion is also relatively inefficient, so that significant amounts of fuel are incompletely combusted or left uncombusted unless low space velocites in the catalyst are employed.

Catalytic combustion reactions follow the course of the graph shown in FIG. 1 of the accompanying drawing to the extent of regions A through C in that Figure. This graph is a plot of reaction rate as a function of temperature for a given catalyst and set of reaction conditions. At relatively low temperatures (i.e., in region A of FIG. 1) the catalytic reaction rate increases exponentially with temperature. As the temperature is raised further, the reaction rate enters a transition zone (region B in the graph of FIG. 1) in which the rate at which the fuel and oxygen are being transferred to the catalytic surface begins to limit further increases in the reaction rate. As the temperature is raised still further, the reaction rate enters a so-called mass transfer limited zone (region C in the graph of FIG. 1) in which the reactants cannot be transferred to the catalytic surface fast enough to keep up with the catalytic surface reaction and the reaction rate levels off regardless of further temperature increases. In the mass transfer limited zone, the reaction rate cannot be increased by increasing the activity of the catalyst because catalytic activity is not determinative of the reaction rate. Prior to the invention described in application Ser. No. 358,411, the only apparent way to increase the reaction rate in a mass transfer limited reaction was to increase mass transfer. However, this typically requires an increase in the pressure drop across the catalyst and consequently a substantial loss of energy. Sufficient pressure drop may not even be available to provide the desired reaction rate. Of course, more mass transfer can be effected, and hence more energy can always be produced by increasing the amount of catalyst surface. In many applications, however, this results in catalyst configurations of such size and complexity that the cost is prohibitive and the body of the catalyst is unwieldy. For example, in the case of gas turbine engines, the catalytic reactor might very well be larger than the engine itself.

As described in application Ser. No. 358,411, it has been discovered that it is possible to achieve essentially adiabatic combustion in the presence of a catalyst at a reaction rate many times greater than the mass transfer limited rate. In particular, it has been found that if the operating temperature of the catalyst is increased substantially into the mass transfer limited region, the reaction rate again begins to increase rapidly with temperature (region D in the graph of FIG. 1). This is in apparent contradiction of the laws of mass transfer kinetics in catalytic reactions. The phenomenon may be explained by the fact that the temperature of the catalyst surface and the gas layer near the catalyst surface are above the instantaneous auto-ignition temperature of the mixture of fuel, air, and any inert gases (defined herein and in application Ser. No. 358,411 to mean the temperature at which the ignition lag of the mixture entering the catalyst is negligible relative to the residence time in the combustion zone of the mixture undergoing combustion) and at a temperature at which thermal combustion occurs at a rate higher than the catalytic combustion rate. The fuel molecules entering this layer burn spontaneously without transport to the catalyst surface. As combustion progresses and the temperature increases, it is believed that the layer in which thermal combustion occurs becomes deeper. Ultimately, substantially all of the gas in the catalytic region is raised to a temperature at which thermal combustion occurs in virtually the entire gas stream rather than just near the surface of the catalyst. Once this stage is reached within the catalyst, the thermal reaction appears to continue even without further contact of the gas with the catalyst.

The foregoing is offered as a possible explanation only and is not to be construed as in any way limiting the present invention.

Among the unique advantages of the above-described combustion in the presence of a catalyst is the fact that mixtures of fuel and air which are too fuel-lean for ordinary thermal combustion can be burned efficiently. Since the temperature of combustion for a given fuel at any set of conditions (e.g., initial temperature and, to a lesser extent, pressure) is dependent largely on the proportions of fuel, of oxygen available for combustion, and of inert gases in the mixture to be burned, it becomes practical to burn mixtures which are characterized by much lower flame temperatures. In particular, carbonaceous fuels can be burned very efficiently and at thermal reaction rates at temperatures in the range from about 1,700° to about 3,200° F. At these temperatures very little if any nitrogen oxides are formed. In addition, because the combustion as described above is stable over a wide range of mixtures, it is possible to select or control reaction temperature over a correspondingly wide range by selecting or controlling the relative proportions of the gases in the mixture.

The combustion method as described in the copending application Ser. No. 358,411 involves essentially adiabatic combustion of a mixture of fuel and air or fuel, air, and inert gases in the presence of a solid oxidation catalyst operating at a temperature substantially above the instantaneous auto-ignition temperature of the mixture, but below a temperature which would result in any substantial formation of oxides of nitrogen under the conditions existing in the catalyst. The limits of the operating temperaure are governed largely by residence time and pressure. The instantaneous auto-ignition temperature of the mixture is defined above. Essentially adiabatic combustion means in this case that the operating temperaure of the catalyst does not differ by more than about 300° F, more typically no more than about 150° F, from the adiabatic flame temperature of the mixture due to heat losses from the catalyst.

Although the present invention is described herein with particularity to air as the non-fuel component of a fuel-air mixture, it is well understood that oxygen is the required element to support combustion. Where desired, the oxygen content of the non-fuel component can be varied, and the term "air" is used herein to refer to the non-fuel components of the mixtures including any gas or combination of gases containing oxygen available for combustion reactions.

While gas turbine engines employing purely thermal combustion have been used extensively as prime movers, especially in aircraft and stationary power plants, they have not been found to be commercially attractive for propelling land vehicles, such as trucks, buses and passenger cars. One reason for this is the inherent disadvantages of systems based purely on thermal combustion or conventional catalytic combustion. However, with the advance provided in combustion utilizing a catalyst as disclosed and claimed in my said copending application, permitting operation at temperatures of the order of about 1,700° to 3,200° F, such turbine propulsion means for land vehicles and the like now are feasible. However, when employed for propelling land vehicles where frequent shutdowns and intermittent use occur, these systems present substantial difficulties in providing fast and non-polluting start-ups. The use of these turbine systems in land vehicles presents a particular problem in that unless a suitable start-up method is employed, substantial pollution of the atmosphere will result during the time taken to reach full operation of the combustion zone containing a catalyst. Until the catalyst body reaches sufficiently high temperature, large amounts of unburned cabonaceous fuel and carbon monoxide are likely to be discharged into the atmosphere.

It is therefore an object of the present invention to provide an effective method for starting a combustion system utilizing a catalyst, which avoids some or all of these difficulties.

The present invention is described and illustrated with reference to the following drawings, in which FIG. 1, as discussed above, is a plot of temperature versus rate of reaction for an oxidation reaction utilizing a catalyst.

Figure 2:
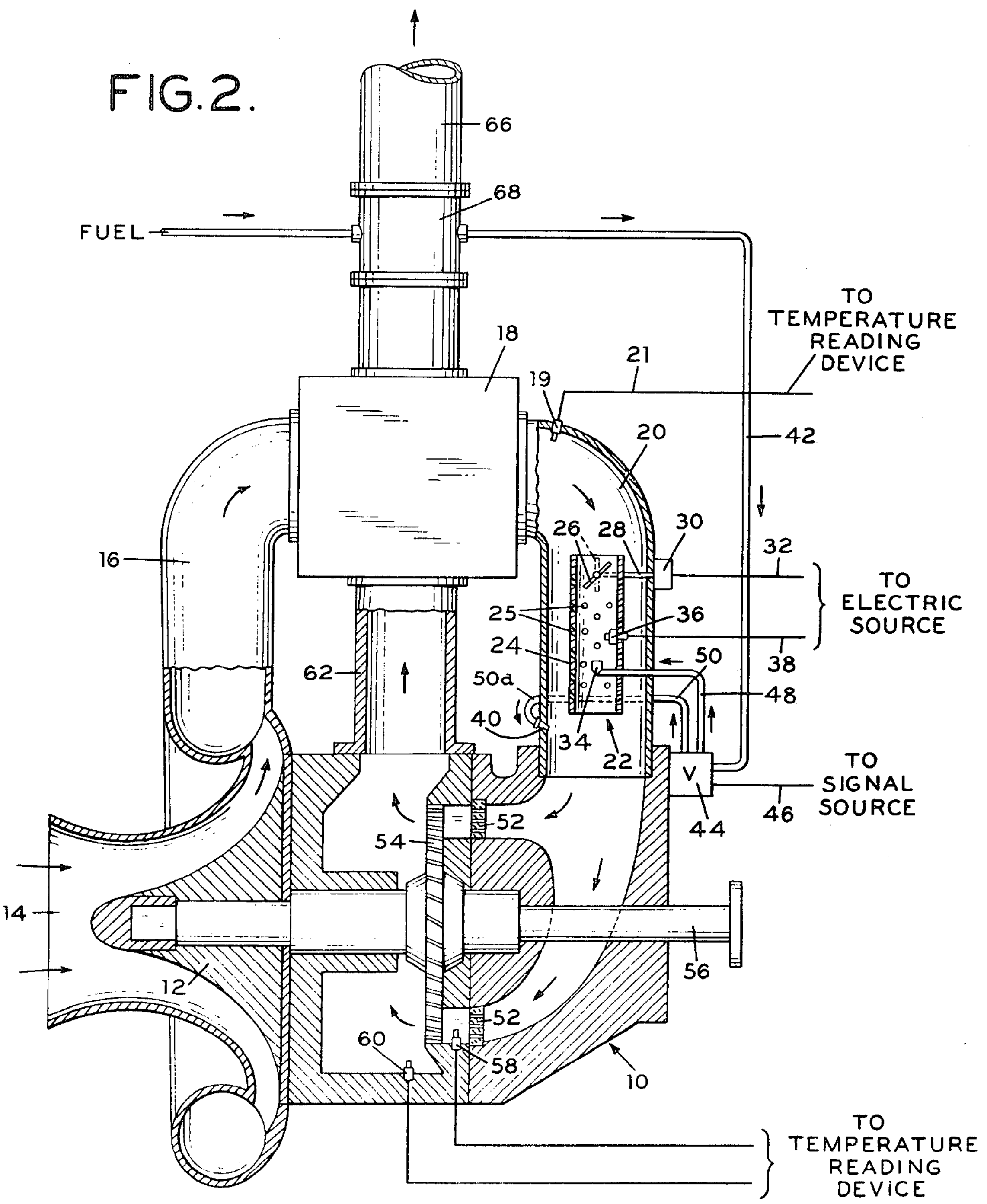

FIG. 2 is a partially schematic breakaway view of a regenerative gas turbine system which is operable in accordance with the present invention.

SUMMARY OF THE INVENTION

The present invention provides a method for the rapid and efficient start-up of combustion systems in which combustion is carried out in the presence of a catalyst, without any concommitant emission of more than minimal amounts of pollutant gases. More specifically, the present invention enables starting of furnaces or turbine systems employing the above-described combustion method of application Ser. No. 358,411 wherein there is minimal pollution of the atmosphere by undesirable exhaust components. The efficient use of fuel and the low contamination of the atmosphere are most important from the ecological standpoint and are becoming progressively more critical. A suitable system for powering, for instance, automotive vehicles, which provide these benefits to society without significant drawbacks in performance or costs is of prime interest.

In accordance with the present invention, there is provided a method of starting a combustion system utilizing a catalyst in which a carbonaceous fuel is combusted in the presence of a catalyst with at least a stoichiometric amount of air for complete oxidation of the fuel to carbon dioxide and water, in which the operating temperature of the catalyst is substantially above the instantaneous auto-ignition temperature of the fuel-air mixture. This method comprises heating the catalyst in the substantial absence of unburned fuel to bring the catalyst to at least a temperature at which it will sustain mass transfer limited operation forming an intimate admixture of carbonaceous fuel and air; and no sooner than essentially concurrently with the catalyst reaching such temperature which will sustain mass transfer limited operation, feeding the admixture of fuel and air to the catalyst for combustion, the combustion being characterized by the fuel-air admixture having an adiabatic flame temperature such that upon contact with the catalyst, the operating temperature of the catalyst is substantially above the instantaneous auto-ignition temperature of the fuel-air admixture but below a temperature that would result in any substantial formation of oxides of nitrogen.

This method may be carried out in various ways, including heating the catalyst body by electrical means such as resistive or induction heating, or by first thermally combusting a fuel and air mixture and applying the heat produced to the catalyst body. Once a catalyst temperature has been reached at which the catalyst will function to sustain mass transfer limited operation, the combustion of fuel in the presence of the catalyst will bring it rapidly to the required operating temperature. Once operating temperature is reached, the catalyst will provide for sustained combustion of the fuel vapor. After the catalyst body reaches a temperature at which it will sustain mass transfer limited operation, the aforementioned application of heat to the catalyst body is no longer necessary and an admixture of unburned fuel and air is introduced into the system to establish the supported thermal combustion in accordance with my said copending application to provide a motive fluid for a turbine or heat to a furnace.

The catalysts suitable for use in carrying out the combustion to which the present invention pertains may be any of a number of catalysts used for the oxidation of carbonaceous fuels. Oxidation catalysts containing a base metal such as cerium, chromium, copper, manganese, vanadium, zirconium, nickel, cobalt, or iron, or a precious metal such as silver or a platinum group metal, may be employed. The catalyst may be of the fixed bed or fluid bed type. One or more refractory bodies with gas flowthrough passages, or a catalyst body comprising a packed bed of refractory spheres, pellets, rings, or the like, may serve suitably. Preferred catalysts for carrying out the above-mentioned combustion method of application Ser. No. 358,411, for example at temperatures of the order of 2,000°–3,000° F, are bodies of the monolithic honeycomb type formed of a core of ceramic refractory material. The flow channels in the honeycomb structures are usually parallel and may be of any desired cross-section such as triangular or hexangular. The number of channels per square inch may vary greatly depending upon the particular application, and monolithic honeycombs are commercially available having anywhere from about 50 to 2,000 channels per square inch. The catalyst substrate surfaces of the honeycomb core, preferably is provided with an adherent coating in the form of a calcined slip of active alumina, which may be stabilized for good thermal properties, to which has been incorporated a catalytically active platinum group metal such as palladium or platinum or a mixture thereof. The particular catalyst and amount employed may depend primarily upon the design of the combustion system, the type of fuel used and operating temperature. The pressure drop of the gases passing through the catalyst, for example, may be below about 10 psi, preferably below about 3 psi, or less than about 10 percent of the total pressure.

When my above-described method of combustion in the presence of a catalyst is employed to drive a fixed turbine in a power plant or to heat a fixed furnace, no serious start-up problem normally is presented. In such installations, the operation is substantially continuous and it is necessary to start the system only at infrequent intervals. Consequently the substantial emissions of atmospheric pollutants which tend to occur in start-ups are not serious because of the small number of infrequent start-ups. While this pollution may be tolerated in stationary operations which are normally used continuously and for long periods of time, it cannot be tolerated in the vehicular type of installation where start-ups are frequent, due to intermittent operation. Also, the start-up must be rapid in order to be as efficient as in the conventional present day automobile. This requires that the start-up take no longer than about 2 to 10 seconds, and during this time the emissions when the method of the present invention is used should not produce any significant environmental pollution problem, even when used in a vast number of vehicles. If cranking alone were to be used in the start-up of a vehicular type of gas turbine installation, the time required would be intolerable, as would the emissions of pollutants to the atmosphere.

In the method of the present invention, rapid start-up of the combustion system is provided by bringing to bear rapid heating of the catalyst body to reach a temperature at which it will sustain mass transfer limited operation, before unburned fuel is applied to the catalyst body. Once the catalyst body has reached this temperature, an intimate admixture of air and unburned fuel can be applied to the catalyst and the customary operation of the system may proceed, with the catalyst temperature rapidly rising to the desired operating temperature. The rapid heating of the catalyst body can take several forms, such as electrically supplying heat directly to the catalyst body to heat it to the aforesaid temperature before the mixture of air and fuel is applied to the catalyst. In accordance with another and preferred embodiment of the invention, a mixture of air and fuel is ignited by a spark plug or glow plug and combusted thermally within the system so as to supply heat to the catalyst body, and, upon heating the catalyst at least to ignition temperature, a suitable combustible mixture of unburned fuel vapor and air is then brought onstream to the heated catalyst so the desired combustion may be established. When the catalyst has reached a temperature at which it will sustain mass transfer limited operation as shown by region C of FIG. 1, starting at "x" on the curve, the source of heat to the catalyst bed may be removed since the continued combustion will keep the catalyst bed at its operating temperature. Care should be taken, of course, that the heat applied to the catalyst during start-up is not sufficient to damage or melt any of the catalyst components. No unburned fuel is applied to the catalyst until it has reached the aforesaid temperature.

In accordance with a preferred embodiment of the invention, the mixture of unburned fuel and air is not introduced to the catalyst body until it has reached a temperature at which it will sustain the desired rapid combustion, as for example, in the region D of FIG. 1, starting with the point "y". Such preferred procedure minimizes pollutant emissions during start-up.

When the start-up method of the present invention is employed, it is possible to start combustion in the catalyst zone within 10 seconds, and frequently within 2 seconds, without exceeding in the the effluent released to the atmosphere more than about 10 parts per million by volume (ppmv) of hydrocarbons, not more than about 100 ppmv carbon monoxide, and not more than about 15 ppmv nitrogen oxides, preferably less than about 10 ppmv nitrogen oxides derived from atmospheric nitrogen.

When the catalyst of the system reaches required temperature, the application of heat to the catalyst may be withdrawn. For example, if thermal combustion of a fuel and air mixture employed for start-up is not terminated when it is no longer required, it tends to introduce its own source of pollution in the emissions and is wasteful, and the continued introduction of heat to the catalyst may cause overheating and damage to the catalyst. However, it may be necessary to continue to supply a decreased amount of heat to vaporize certain liquid fuels. In any event the system is ready for normal operation when the catalyst is at the required minimum operating temperature, and the external supply of heat then advantageously is discontinued.

The fuels employed in the present invention for both start-up and for normal operation of the system may be gases or liquids at ambient temperatures. If a liquid, the fuels preferably have a vapor pressure high enough so that they may be essentially completely vaporized by the air employed, with or without the aid of heat supplied by the system. The fuels are usually cabonaceous and may comprise normally liquid hydrocarbons, for instance, hexane, cyclohexane and other normal, cyclic and branched hydrocarbons, including aromatic hydrocarbons, such as toluene, xylene, benzene, gasoline, naphtha, jet fuel, diesel fuel, etc. Gaseous hydrocarbons, such as methane, ethane, or propane, may be used. Other carbonaceous fuels such as alkanols of about one to ten carbon atoms or more, e.g., methanol, ethanol, isopropanol, etc. and other materials containing combined oxygen may be employed. Various petroleum fractions can be utilized including kerosene, fuel oils, and even residual oils may be used.

SPECIFIC DESCRIPTION OF THE INVENTION

The method of the present invention now will be further described with reference to FIG. 2 of the drawings, illustrated in a partially schematic breakaway view of regenerative gas turbine arranged to be operated in accordance with the present invention.

The turbine system shown in FIG. 2 for operation in accordance with the present invention is designated generally by the numeral 10. As depicted, air enters compressor 12 through air inlet ports 14. The compressed air is passed through channel 16 to regenerate heat exchanger 18. The air exits heat exchanger 18 into chamber 20. Thermocouple 19 is positioned at this exit of heat exchanger 18 to measure the temperature of the compressed air to be admixed with the fuel. Line 21 transmits the thermocouple signal to a suitable receiving means. Chamber 20 also acts as the fuel distributor portion of the turbine system. The thermal combustor is generally designated by the numeral 22 and is shown as located in the upstream portion of said chamber 20.

The thermal combustor 22 is comprised of cylindrical shield 24 which is concentrically located within chamber 20 and serves to prevent blowout of the thermal combustion during start-up and provides a heat transfer buffer from the thermal combustion zone to the walls of chamber 20. Shield 24 is desirably equipped with slits 25 in its walls, as is customary in combustors. This prevents overheating of the walls which might otherwise result from flame impingement. At the upstream end of shield 24 is valve 26. Valve 26 is designed to be activated during start-up of the engine to limit the flow, and hence velocity, of the air through shield 24 and prevent blowout. The positioning of valve 26 is effected by lever 28 which is activated by controller 30 which upon receiving an electrical signal via line 32 will convert the signal to a mechanical response. Fuel is introduced into the thermal combustion zone via distribution nozzle 34 and is directed in an upstream direction. Igniter 36 is positioned such that the spray of fuel from distribution nozzle 34 can be ignited. Igniter 36 is energized by current through line 38.

Fuel for the combustor is distributed in chamber 20 by nozzle 40. The fuel for the thermal combustion at start-up and for the continued combustion utilizing the catalyst is derived from line 42 which supplies fuel to valve 44. Valve 44 is electrically activated by a signal transmitted through line 46 to pass all of the fuel via line 48 to distributor nozzle 34 or to pass all of the fuel via line 50 (which goes behind chamber 20 and turns in on the other side at 50*a*) to communicate with outlet to nozzle 40. Catalyst body 52 is positioned downstream from nozzle 40 and is depicted as being adjacent to turbine blade 54. As shown, the catalyst body 52 is positioned so as to avoid impingement of flame from the thermal combustor 22 on the catalyst. Turbine blade 54 is connected to power shaft 56 which is employed to drive compressor 12 as well as provide the motive power. Thermocouples 58 and 60 are positioned before and after the turbine blade to measure the temperature of the gases and the temperature drop across the turbine blade.

The turbine components are desirably constructed of high temperature resistant materials, such as silicon nitride or other high temperature material, to enable the turbine to withstand high temperatures. Alternately, temperature exposure of the turbine components may be decreased by cooling with air according to methods well known in the turbine art.

The exhaust gases are transported from the turbine blade area by conduit 62. Conduit 62 feeds the exhaust gases into heat exchanger 18 where the heat from the exhaust gases is employed in indirect heat exchange to preheat the incoming air for combustion. Outlet 66 is employed to conduit the exhaust gases to, for instance, the atmosphere, and is provided with heat exchanger 68 which heats the incoming fuel in line 42 by indirect heat exhange.

In start-up of operation, according to the method of this invention, the turbine system is set up for start-up as follows. An electrical starting motor (not shown) is energized and serves to rotate drive shaft 56 and thereby operate compressor 12. Drive shaft 56 also serves to provide power to a fuel pump (not shown) which supplies fuel to line 42. Simultaneously with the energizing of the starting motor, igniter 36 is energized by a signal transmitted through line 38 and valve 44 is activated by a signal from line 46 to pass all the fuel to distributor nozzle 34. The liquid fuel is sprayed into the thermal combustion zone and ignited with the incoming air from the compressor. A typical temperature of the flame is about 4,000° F. As the turbine speed increases, controller 30 is energized by a signal transmitted through line 32 to actuate lever 28 and place valve 26 in the position illustrated by the solid line in the drawing. The position of valve 26 is partially closed prevents blowout of the flame by excessively high air velocities. Alternate means such as baffling or the like, may be used for preventing excessive local air velocity which might cause blowout. The temperature of the heated gases directed to the catalyst will be in the order of 3,000° F. Igniter 36 can be shut off when ignition is achieved which may be simultaneous with disengagement and shut-down of the starter motor. The thermal combustor can assist initial start-up rotation of the turbine.

As soon as the catalyst has been heated to a temperature which will sustain mass transfer limited operation, and preferably to a temperature above the instantaneous auto-ignition temperature of the fuel-air mixture entering the catalyst, as determined when thermocouple 58 indicates that a predetermined temperature has been reached, such as by thermocouple 19 which transmits a signal proportional to the temperature in line 21 to a receiving device (not shown), or by the fact that the thermal preheating combustion has taken place for a sufficient period of time, a major proportion of the fuel supply is diverted from distribution nozzle 34 to nozzle 40. When sufficient heating of the catalyst has taken place, such as by achieving a catalyst temperature of at least about 1,250° F, and preferably as high as 2,000° F, simultaneous signals are relayed to controller 30 and valve 44 via lines 32 and 46, to open valve 26 to the position indicated by the broken lines and to reduce substantially the flow of fuel via distribution nozzle 34 and instead divert a major proportion of the fuel to nozzle 40. Desirably, there should be a short, but finite, delay after decreasing the flow of fuel from distributor nozzle 34 before introducing fuel to nozzle 40 so as to prevent preignition of the fuel emanating from nozzle 40, under conditions where the rate of air flow is insufficient to extinguish the thermal combustion of fuel at distribution nozzle 34. If there is no delay, the fuel emanating from nozzle 40 may become ignited before the flame resulting from the burning of fuel from distributor nozzle 34 has been sufficiently reduced in intensity. This is to be avoided.

The flame supported by the fuel which continues to emanate at a decreased rate from distribution nozzle 34 is kept burning for a short period of time to preheat the air to provide vaporization of liquid fuel when it emanates from nozzle 40 until the air emanating from the heat exchanger 18 is sufficiently hot to vaporize that fuel. After ignition is achieved in the catalyst zone, the thermal combustion provided by the fuel emanating from distribution nozzle 34 serves an entirely different function. It no longer serves to heat the catalyst body, but serves to assist in vaporizing the fuel.

When the system becomes fully operational, the heat exchanger 18 is capable of supplying all of the preheating necessary to vaporize the fuel and the distribution nozzle 34 may be turned off and the purely thermal preheating combustion terminated. The normal period of time necessary to continue the preheating from distribution nozzle 34 after the fuel is diverted to nozzle 40 may be of the order of 30 seconds or or considerably longer, depending on the initial temperature and the mass of the heat exhanger 18.

It will be understood that the method of the present invention can be carried out with turbine systems in which air is supplied to the combustor from the compressor directly without heat exchange. In such systems air from the compressor typically is hot enough for fuel vaporization as soon as the turbine reaches operation speed.

Once combustion in the zone containing the catalyst is achieved, the fuel-air admixture is passed to the catalyst at a gas velocity, prior to or at the inlet to the catalyst, in excess of the maximum flame propagating velocity. This avoids flash-back that causes the formation of $NO_x$. Preferably this velocity is maintained adjacent to the catalyst inlet. Suitable linear gas velocities are usually above about three feet per second, but it should be understood that considerably higher velocities may be required depending upon such factors as temperature, pressure, and composition.

What is claimed is:

1. A turbine system, comprising:

a gas turbine;

means for forming a mixture of compressed air and fuel;

a combustor having a catalyst disposed therein for receiving and combusting said mixture to form a combustion effluent;

means for preheating said catalyst in the substantial absence of unburned fuel prior to the introduction of said mixture into said combustor; and means for supplying said combustion effluent to drive said turbine.

2. The turbine system of claim 1, wherein said means for preheating said catalyst comprises a thermal combustor for combusting a mixture of fuel and air to form a hot effluent substantially free of unburned fuel and means for passing said hot effluent past said catalyst to preheat said catalyst.

* * * * *